United States Patent Office 3,328,447
Patented June 27, 1967

3,328,447
4-HEXENYL ALUMINUM COMPOUNDS
Alfred Peter Kottenhahn, Wilmington, Del., assignor to E. I. du Pont de Nemours and Company, Wilmington, Del., a corporation of Delaware
No Drawing. Filed May 13, 1963, Ser. No. 280,144
2 Claims. (Cl. 260—448)

This invention relates to new catalysts for the polymerization, including copolymerization, of alpha-olefins and particularly to new compounds which can be used to prepare the new catalysts.

It is an object of the present invention to provide new alpha-olefin polymerization catalysts of the type made by combining an organo aluminum compound with a reducible transition metal compound. Another object of the present invention is to provide new compounds which can be used as the organo aluminum component of the new catalysts. Other objects will appear hereinafter.

These and other objects are accomplished in part by the new polymerization catalysts made by combining in a suitable liquid medium a 4-hexenyl aluminum compound with a reducible transition metal compound, representative examples of which are vanadium oxytrichloride, or tris (acetylacetonate), or titanium tetrachloride. The catalyst thus obtained can be employed to effect the polymerization of alpha-olefins and is particularly useful to catalyze copolymerization of alpha monoolefins with or without non-conjugated dienes.

Other objects of the present invention are accomplished by the new compounds which can be used as the organo aluminum component of the above described catalyst. Generally, these new compounds can be described as 4-hexenyl aluminum compounds, and include tri(4-hexenyl) aluminum and di(4-hexenyl)aluminum monohalide. The 4-hexenyl aluminum compounds can be further described by the formula $$(CH_3—CH=CH—CH_2—CH_2—CH_2)_xAl(Z)_y$$

where $Z$=chlorine or bromine; $x$=2 or 3; $y$=0 or 1; and $x+y=3$.

Compounds included within this formula are: tri-(4-hexenyl)aluminum; di(4-hexenyl)aluminum monochloride; and di(4-hexenyl)aluminum monobromide.

Tri(4-hexenyl)aluminum is prepared by the reaction of diisobutyl aluminum monohydride with 1,4-hexadiene to give 4-hexenyldiisobutyl aluminum which undergoes a disproportionation into symmetrical tri-substituted aluminum compounds according to the following scheme during distillation:

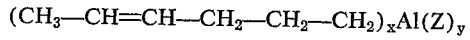
$$3(CH_3—CH=CH—CH_2—CH_2—CH_2)Al$$
$$[CH_2—CH(CH_3)_2]_2 \rightarrow$$
$$(CH_3—CH=CH—CH_2—CH_2—CH_2)_3Al+2$$
$$[(CH_3)_2CH—CH_2]_3Al$$

This result corresponds to the behavior of mixed saturated aluminum trialkyls which are known to disproportionate on distillation into the symmetrical aluminum trialkyls. E. G. Hoffman, Ann. Chem., Liebigs, 629, 104 (1960).

A typical preparation of tri(4-hexenyl)aluminum is as follows: The reaction is carried out by mixing the diisobutyl aluminum monohydride with at least a molar proportion, preferably a molar excess, of 1,4-hexadiene under a protective atmosphere of nitrogen or other inert gases such as helium or argon. After addition is complete, the agitated mixture is heated carefully and allowed to reflux for several hours. An exothermic reaction occurs in the range of temperatures of about 67–75° C. If desired, an inert organic solvent such as methylcyclohexane or isooctane can be employed. The reaction time is not critical. After the unreacted 1,4-hexadiene has been removed under vacuum at room temperature, the liquid residue is fractionally distilled under vacuum. The lowest boiling fraction (B.P. 40–50° C. at 0.6–0.4 mm. Hg) is triisobutyl aluminum. A higher boiling fraction, in small proportions, may then be collected. Finally, tri(4-hexenyl)aluminum comes off as the highest boiling fraction (89–92° C. at 0.05 mm. Hg.).

The di(4-hexenyl)aluminum monohalides are prepared in solution by the reaction of 2 molar proportions of tri(4-hexenyl)aluminum with 1 molar proportion of the appropriate aluminum trihalide. The procedure is exemplified hereinafter in detail. In general, a solution of the organo aluminum compound in an inert organic liquid, which is also a solvent for the di(4-hexenyl)aluminum monohalide, such as tetrachloroethylene, is added under nitrogen to anhydrous aluminum trihalide. Agitation is optional. The temperature at which this operation is carried out is not critical; room temperature is satisfactory. The end of the reaction can be visually determined by noting the disappearance of the solid phase of the aluminum trihalide.

The organo aluminum compounds of the present invention are indefinitely stable when protected from atmospheric oxygen and moisture, and well-known coordination catalyst poisons such as carbon dioxide, carbon monoxide, hydrogen sulfide, and organic compounds containing Zerewitinoff active hydrogen atoms. Since these organo aluminum compounds are spontaneously flammable on contact with air, they should always be stored and used under a protective atmosphere of an inert gas such as nitrogen.

Coordination polymerization catalysts can be prepared by reacting the organo-aluminum compounds of the present invention with a reducible transition metal compound. Generally, these metals are heavy transitional metals of Groups IV to VIB such as titanium, zirconium, cerium, thorium, vanadium, niobium, tantalum, chromium, molybdenum, tungsten and uranium as well as Group VIII metals such as iron, cobalt, copper, nickel and manganese. These metals have directly attached thereto at least one substituent selected from the group consisting of halogen, oxygen, hydrocarbon, and O-hydrocarbon. Titanium and vanadium compounds are particularly preferred. Representative examples include: vanadium oxytrichloride, vanadium tris(acetylacetonate), vanadium oxybis(acetylacetonate), vanadium tetrachloride, vanadium tris(p-chlorophenyl)orthovanadate, titanium tetrachloride, chromium trichloride, ferric bromide, and molybdenum pentachloride.

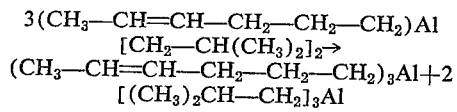

The halogen bearing organo-aluminum compounds of the present invention can be reacted with any of the above-described transition metal compounds. However, the trialkenyl aluminum compound requires a halogen-bearing reducible transition metal compound, e.g. $VOCl_3$.

The new coordination catalyst of the present invention can be made in the presence or absence of the monomers, in liquid form, to be polymerized. In addition or in place of the monomers to be polymerized, any liquid medium or inert organic liquid customarily used for coordination catalyst reactions (e.g. tetrachloroethylene, hexane, cyclohexane, and benzene) is suitable. As is well known, these liquid media are free from groups bearing Zerewitinoff active hydrogen atoms (e.g. alcoholic hydroxyl, aliphatic primary amine).

The molar ratio in the catalyst reactants of aluminum to reducible metal is generally greater than 1. In a representative case with vanadium oxytrichloride, the aluminum/vanadium ratio is about 3. Ratios as high as 20 may be employed, but there are generally no outstanding advantages using ratios above 8.

The catalyst system made by the mixing of the 4-hexenyl aluminum compounds with the reducible transition metal compounds can be used for effecting the room temperature polymerization of a wide variety of monolefins and conjugated and non-conjugated dienes. Higher and lower polymerization temperatures can be employed, but are less preferred than polymerization at a temperature of about 25° C. The preferred alpha-monoolefins have the structure $CH_2CH=R$ where R is a hydrogen atom or a $C_1-C_{16}$ alkyl radical, preferably straight-chained. Representative examples of these monomers include ethylene; propylene; 1-butene; 1-hexane; 1-decene; 1-octadecene; and 4-methyl-1-pentene. Monomers and mixtures of two or more of these monomers can be employed. The catalysts can be used to copolymerize at least one alpha-monoolefin with at least one non-conjugated diene such as 1,4-hexadiene; dicyclopentadiene; and 5-methylene-2-norbornene. Copolymers of this sort are more particularly described in U.S. Patents 2,933,480 and 3,063,973 and French Patents 1,285,090, 1,302,960, and 1,196,897.

The copolymers obtained can be isolated in accordance with the customary procedures. Thus to stop the reaction, the catalyst is deactivated by introduction of alcohol or water; and the solvents and residual monomer are then removed under reduced pressure to give the copolymer product; alternatively, the copolymer can be precipitated by the addition of a nonsolvent such as ethanol.

The following examples are representative of the products and processes of the present invention.

EXAMPLE 1

*Preparation of tri(4-hexenyl) aluminum*

Eighty grams (0.98 gram-mole) of 1,4-hexadiene was added with rapid stirring to 42 grams (0.295 gram-mole) of diisobutyl aluminum monohydride under a nitrogen atmosphere. Heat was then applied. At 65–70° C., an exothermic reaction occurred raising the temperature to 75° C. After the heat evolution had subsided, the mixture was kept at 77° C. (gentle reflux of excess 1,4-hexadiene) for 5.25 hours. It was then cooled under nitrogen and left at room temperature overnight. Excess diene was removed under aspirator vacuum at room temperature and the liquid residue distilled under vacuum through a 1.5-foot spinning band column. Three fractions were taken:

(A) B.P. 40–50° C. at 0.6 to 0.4 mm. Hg (33 grams)
(B) B.P. 62° C. at 0.16 mm. Hg to 88° C. at 0.05 mm. Hg (8.5 grams)
(C) B.P. 89–92° C. at 0.05 mm. Hg (12.4 grams)

Small-scale hydrolyses of the three fractions in toluene with dilute $H_2SO_4$ and subsequent VPC (Vapor Phase Chromatography) analyses of the organic phases were carried out. Since Fraction A yielded isobutane and only faint traces of $C_6$ hydrocarbons, it was considered to be essentially composed of pure triisobutyl aluminum. The hydrolysate from Fraction B showed strong peaks for isobutane, and $C_6$ hydrocarbons. The hydrolysate from Fraction C showed no peaks for isobutane, or hydrogen; this indicated the absence of Al-isobutyl bonds and Al-hydrogen bonds in Fraction C. It did show the presence of a $C_6$ hydrocarbon material identified by VPC comparison as 2-hexene.

An elemental analysis of Fraction C was carried out.

Calcd. for $C_{18}H_{33}$ Al: C, 78.2; H, 13.03; C:H, 6.50.
Found: C, 77.0, 76.8; H, 11.9, 11.8; C:H, 6.47, 6.50.

EXAMPLE 2

*Preparation of di(4-hexenyl)aluminum monochloride*

Ten milliliters of a 1 molar solution of tri(4-hexenyl)-aluminum in tetrachloroethylene (0.01 gram-mole) was added at 25° C. under nitrogen to 0.65 gram of anhydrous aluminum trichloride (0.0049 gram-mole) with occasional shaking. After the mixture had been allowed to stand overnight at 25° C. without agitation, all the aluminum trichloride had dissolved. The tetrachloroethylene then contained a 1.5 molar solution of di(4-hexenyl)aluminum monochloride.

EXAMPLE 3

(A) *Monomer Purification*

Ethylene and propylene were purified by passage through molecular sieve columns (Type A, 1/16-inch, Fischer Laboratory Chemicals) and metered through calibrated rotometers. The 1,4-hexadiene was purified prior to use by passage through activated alumina (Woelm, neutral grade activity I) under a nitrogen atmosphere.

(B) *Preparation of ethylene/propylene/1,4-hexadiene copolymer with tri(4-hexenyl)aluminum/$VOCl_3$ catalyst*

One milliliter of a 1 molar solution of vanadium oxytrichloride in tetrachloroethylene and 3 milliliters of a 1 molar solution of tri(4-hexenyl)aluminum in tetrachloroethylene were sequentially introduced from hypodermic syringes into 1 liter of tetrachloroethylene contained in a 1.5-liter resin kettle which had been flame-dried and cooled under a protective atmosphere of dry nitrogen before use. After the agitated mixture had been aged for 1 minute at 25° C., 9 milliliters of 1,4-hexadiene (0.075 gram-mole) was introduced from a syringe. Immediately thereafter a monomer gas stream was introduced through a dip tube into the agitated mixture. During the following 40 minutes, the reaction was conducted at 25° C. while the monomers were supplied at the following rates:

| Propylene Flow Rate (ml./min.) | Ethylene Flow Rate (ml./min.) | Time (min.) |
| --- | --- | --- |
| 3,600 | 400 | 5 |
| 3,000 | 1,000 | 11 |
| 1,500 | 500 | 24 |

The polymerization was then stopped by introduction into the resin kettle of 10 milliliters of isopropyl alcohol. The monomer gas feed was shut off and the copolymer solution was thereafter extracted with 100 milliliters of (1:4) hydrochloric acid, washed with 500 milliliters of distilled water, and pan-dried overnight. Removal of the solvent gave 8 grams of an ethylene/propylene/1,4-hexadiene copolymer displaying an inherent viscosity of 2.37 (measured at 30° C. on a tetrachloroethylene solution containing 0.1% by weight copolymer) and analyzing for 51% by weight propylene monomer units and 5.6% by weight 1,4-hexadiene monomer units.

(C.) *Preparation of ethylene/propylene copolymer with di(4-hexenyl)aluminum chloride/$VOCl_3$ catalyst*

The general procedures of Parts A and B of Example 3 above were repeated except as noted hereafter. The organo aluminum compound was supplied as a 2-milliliter portion of a 1.5 molar solution of di(4-hexenyl)aluminum monochloride in tetrachloroethylene. The 1,4-hexadiene was omitted. After the catalyst had been aged for 1 minute at 25° C., the reaction was begun by introduction of a gas stream supplying propylene and ethylene at the following rates:

| Propylene Flow Rate (ml./min.) | Ethylene Flow Rate (ml./min.) | Time (min.) |
|---|---|---|
| 3,600 | 400 | 5 |
| 3,000 | 1,000 | 20 |

After the solvent had been removed from the purified copolymer solution, 18.7 grams of copolymer were isolated exhibiting an inherent viscosity of 3.35 (measured as before) and analyzing for 59.5 percent by weight propylene monomer units.

*Example 4*

*Preparation of ethylene/propylene/1,4-hexadiene copolymers with di(4-hexenyl)aluminum monochloride/VOCl$_3$ catalyst*

The general procedures of Parts A and B of Example 3 above were repeated except as noted hereafter. The catalyst was formed in the presence of all the monomers. Initially 1 liter of tetrachloroethylene at 25° C. was saturated by introduction of a monomer gas stream supplying propylene and ethylene at the respective rates of 3000 and 1000 militers per minute. After 9 milliliters of 1,4-hexadiene had been introduced into the saturated olefin solution, the reaction was initiated by the sequential addition of 1 molar vanadium oxytrichloride and 2 milliliters of a 1.5 molar solution of di(4-hexenyl)aluminum chloride in tetrachloroethylene. The monomer gas stream was supplied at the above described rate for 10 minutes; during the last 10 minutes of reaction time the rate was halved. After the copolymer had been isolated and dried, it weighed 6.9 grams, exhibited an inherent viscosity (measured as before) of 1.31 and analyzed for 46% by weight propylene monomer units and 5% by weight 1,4-hexadiene monomer units.

*Example 5*

*Preparation of ethylene/propylene/1,4-hexadiene copolymer with tri(4-hexenyl)aluminum/tris(p-chlorophenyl) orthovanadate catalyst*

Five milliliters of a 1 molar solution of tri(4-hexenyl) aluminum in tetrachloroethylene and 0.45 gram of tris-(p-chlorophenyl)orthovanadate (Al:V 5:1) were mixed together in 1 liter of tetrachloroethylene at 25° C. After the agitated catalyst had been aged for 1 minute, 9 milliliters of 1,4-hexadiene (3.075 gram-mole) were added. Immediately thereupon a monomer gas feed mixture was introduced supplying propylene and ethylene at the following rates:

| Propylene Feed Rate (cc./min.) | Ethylene Feed Rate (cc./min.) | Time (min.) |
|---|---|---|
| 3,600 | 400 | 5 |
| 3,000 | 1,000 | 10 |
| 1,500 | 500 | 30 |

The catalyst was deactivated by addition of 10 milliliters of isopropyl alcohol, the polymerization solution was twice extracted with 400 milliliters of hydrochloric acid (1:4), washed with 500 milliliters of distilled water, and concentrated overnight at 25° C. by evaporation. 6.9 grams of an ethylene/propylene/1,4-hexadiene copolymer were obtained exhibiting an inherent viscosity of 1.94 (measured at 20° C. on a 0.1% by weight solution in tetrachloroethylene.)

Polymerization and copolymerization of other alpha-olefins can be effected with the new catalysts of the present invention in accordance with representative processes hereinbefore depicted.

As many widely different embodiments of this invention may be made without departing from the spirit and scope thereof, it is to be understood that this invention is not limited to the specific embodiments thereof except as defined in the appended claims.

What is claimed is:
1. Di(4-hexenyl)aluminum monochloride.
2. Di-(4-hexenyl)aluminum monobromide.

References Cited

UNITED STATES PATENTS

| 2,271,956 | 2/1942 | Ruthruff | 260—448 |
| 2,786,860 | 3/1957 | Ziegler et al. | 260—448 |
| 2,945,846 | 7/1960 | Wisseroth et al. | 252—429 |
| 2,962,451 | 11/1960 | Schreyer | 252—429 |
| 3,014,941 | 12/1961 | Walsh | 260—448 |
| 3,035,077 | 5/1962 | Johnson et al. | 260—448 |
| 3,062,856 | 11/1962 | D'Alelio | 260—448 |
| 3,084,180 | 4/1963 | D'Alelio | 260—448 |
| 3,113,115 | 12/1963 | Ziegler et al. | 252—429 |

OTHER REFERENCES

Ziegler et al.: Annalen Der Chemie, 589, 1954, pp. 102–105.

TOBIAS E. LEVOW, *Primary Examiner.*

SAMUEL H. BLECH, *Examiner.*

H. M. S. SNEED, *Assistant Examiner.*